United States Patent [19]

Phaal et al.

[11] 4,252,102
[45] Feb. 24, 1981

[54] CUTTING ELEMENT FOR PROCESSING ROCKS, METAL OR THE LIKE

[75] Inventors: Cornelius Phaal, Sandton, South Africa; Rainer Jurgens, Celle, Fed. Rep. of Germany

[73] Assignee: Christensen, Inc., Salt Lake City, Utah

[21] Appl. No.: 31,483

[22] Filed: Apr. 19, 1979

[51] Int. Cl.$^3$ .............................................. B28D 5/04
[52] U.S. Cl. ................................... 125/39; 76/101 A; 407/119
[58] Field of Search ...................... 76/101 A; 407/119; 125/39

[56] References Cited

U.S. PATENT DOCUMENTS

| | | | |
|---|---|---|---|
| 1,895,926 | 1/1933 | Hoyt | 76/101 A |
| 1,950,356 | 3/1934 | De Bats | 76/101 A |
| 2,275,021 | 3/1942 | Somes | 76/101 A |
| 3,702,573 | 11/1972 | Nemeth | 407/119 |
| 3,743,489 | 7/1973 | Wentorf | 51/307 |

*Primary Examiner*—Harold D. Whitehead
*Attorney, Agent, or Firm*—Rufus M. Franklin

[57] ABSTRACT

A cutting element for processing of rock, in particular, but also metal, comprising a support member of cemented carbide or the like hard material and a cutting member made of polycrystalline diamond or like superhard cutting material, said members together forming the cutting element, the cutting element being formed by a cutout of a blank comprising a core zone of the cutting material and an outer zone of the hard material surrounding said core zone in the form of a shell, at least at the periphery thereof. The cutting element typically forms a wedge-shaped section of the blank.

6 Claims, 4 Drawing Figures

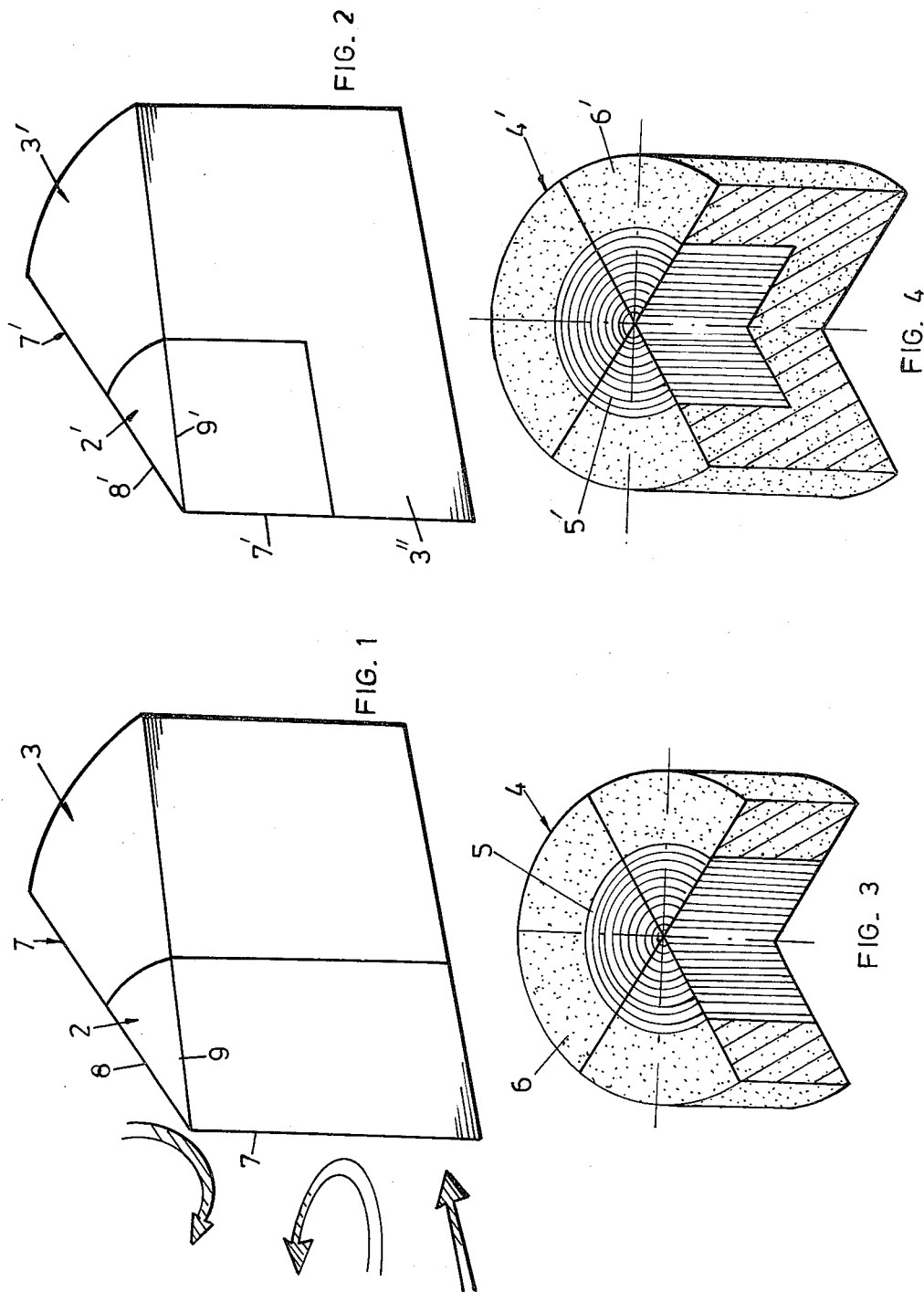

CUTTING ELEMENT FOR PROCESSING ROCKS, METAL OR THE LIKE

The invention relates to a cutting element for processing rock, in particular, but also metal, consisting of a support member of cemented carbide or the like hard material, and a cutting member, made of polycrystalline diamond or the like superhard cutting material, which is joined or bonded to the former.

In the case of known cutting elements of this type, the cutting member consists of a thin upper layer completely covering the support member, the shape of the support member corresponding exactly to that of the cutting member.

Generally the cutting member consists mainly of a mass of abrasive particles, normally present in an amount of at least 70%, but preferably 80 to 90% by volume, of the cutting member bonded into a polycrystalline conglomerate or compact. Such cutting members replace single large crystals. Diamond or cubic boron nitride abrasive particles can be so bonded together by self-bonding without the aid of metal or the like bonding matrix, but stronger and more durable polycrystalline conglomerates for cutting members are obtained if a suitable bonding matrix is present.

In the case of cutting members made from cubic boron nitride, i.e. compacts in which the abrasive particles are predominantly cubic boron nitride, the bonding matrix, when used, preferably contains a catalyst, also known as a solvent, for cubic boron nitride growth, e.g. aluminium or an alloy of aluminium and nickel, cobalt, iron, manganese or chromium. Such catalysts or solvents are relatively soft and in order to minimise smearing of the catalyst during use of the cutting member, the bonding matrix should preferably include a ceramic material, such as silicon nitride, which is capable of reacting with the catalyst to produce a hard material. In the case of cutting members made from diamond, i.e. compacts in which the abrasive particles consist predominantly of synthetic or natural diamond, the bonding matrix, when used, preferably contains a solvent for diamond growth of which metals of Group VIII of the Periodic Table such as cobalt, nickel or iron or an alloy of such metals are suitable. Diamond or cubic boron nitride compacts for forming cutting members are generally manufactured under conditions of temperature and pressure at which the abrasive particles are crystallographically stable.

The support member generally takes the form of a small plate e.g. a thin circular disc, or of a plug, possibly with a widened head and consists of cemented carbide or hard metal, or other suitable hard material, in many cases steel, with a high resilience modulus, e.g. M or T series. Such support members form compacts which facilitate the fixing of the cutting members to a tool. They provide support on the sides of the cutting members which are remote from the effective cutting forces.

Cutting elements as described above are not only relatively expensive but, because of their configuration, are also limited in their uses. On the chipping surface formed on the upper face of the cutting member, on their cutting edge and also on their exposed surface, they suffer from rapid wear and tear and in many cases cannot be used to the full.

The invention provides a solution to these problems by way of a cutting element of the kind described above, which firstly is characterised in that it is formed by a cutout of a blank comprising a core zone of the cutting material and an outer zone of the hard material surrounding said core zone in the form of a shell at least at the periphery thereof. It is preferable if the cutting element forms a wedge-shaped section of the blank and if the top and bottom sides of the said cutting element are plane parallel to one another. The support member and the cutting part of the cutting element can be of the same height, but it is also possible that the support member of the cutting element supports the full bottom surface as well as the full rear surface of the cutting member.

The cutting member of the invention forms an exposed cutting point as well as several exposed cutting edges, so that the cutting element is particularly versatile and can be used for turning, milling and drilling operations. Since the cutting member is formed from a compact enlarged at the corner zone, there results a favourable heat removal, reducing wear and tear, from the cutting part to the support member and thence possibly to the whole tool, while the cutting member is in use. There results further a substantially improved capacity for use of the cutting member, resulting in substantially longer operating times without loss in functioning capacity. According to the angle of placement of the cutting member in relation to a workpiece to be processed, it can be used for cutting or only scratching or marking or scraping. Moreover, the cutting member is held securely and supported by the support member. In particular, the manufacture of these cutting elements is simple and inexpensive, in a variety of different forms.

The blanks can basically have suitable shapes respectively for regular or even irregular cutting. In a preferred form the outer zone of the blank consists of an annular body surrounding the core zone only at the periphery which, when cut, e.g. by spark erosion, produces cutting elements in the form of wedge-shaped sections of which the whole wedge point zone consists of polycrystalline diamond or the like superhard cutting material. The cutting member in this form presents five exposed cutting edges of which the cutting edges formed on the upper edge and the lower edge intersect the inner cutting edge at the sharp end of the wedge to form two cutting points.

In another preferred embodiment, the outer zone of the blank can form a hollow cylinder closed at the bottom, of which the hollow space is completely filled by the core zone. When such a blank is cut, cutting elements are produced which provide a particularly good support for the cutting member as each has its own support member while the cutting member still forms three cutting edges along three angularly intersecting boundary lines.

Two embodiments of the invention are now more fully described with reference to the drawings in which FIGS. 1 and 2 illustrate in perspective views of different cutting elements according to the invention;

FIGS. 3 and 4 represent perspective views of blanks from which the cutting elements of FIGS. 1 and 2 are formed by cutting.

The cutting element 1 shown in FIG. 1 consists of a cutting member 2 of polycrystalline diamond or the like superhard cutting material as well as a support member 3 of hard metal or cemented carbide e.g. tungsten carbide, titanium carbide, tantalum carbide or mixtures thereof. Preferably, the cemented support member 3 includes a metal bonding matrix which consists of cobalt, nickel, iron or the like, or a mixture thereof. The metal bonding matrix is usually provided in an amount of about 3 to 35 percent by weight of the carbide used.

The cutting element 1 is formed by a section of the blank 4 (FIG. 3), with a core zone 5 of cutting material on an outer zone 6 forming a sleeve around it, and formed of hard metal or cemented carbide. As shown in FIG. 3, this outer zone 6 has the form of an annular body or cylinder, of which the annular or inner space is filled with a cylindrical or disc-shaped core zone 5. Correspondingly, the cutting elements formed by sectioning such a blank are wedge-shaped, where the cutting member 2 and the support member 3 are of the same height. The cutting member 2 presents a cutting edge 7 stretching over the whole height of the cutting element 1 and also two further cutting edges 8 and 9 on the upper and lower edges which, with the cutting edge 7, intersect at a point, to form a cutting point. The arrows shown in FIG. 1 show the working directions in which a workpiece to be processed can be moved in relation to the cutting element. Of course, the workpiece can remain in one place and the cutting element can be moved in the desired direction. The angle defined by the sharp end of the wedge can be varied, but normally angles of 45°, 60° or 90° are chosen. The lateral wedge or boundary surfaces of the cutting member are, in the embodiment given, planar in the axial and radial direction.

The cutting element 1' as illustrated by FIG. 2 corresponds in form to that of FIG. 1 but its cutting member 2' extends over only a part of the height of the cutting element 1'. The support member 3' does not only support the cutting member 2' over its full rear surface, as in the case of the cutting element 1 of FIG. 1, but also over its entire lower surface by means of a wedge-shaped pointed portion 3'' which is shown.

A cutting element of this type is formed from a section of a blank 4' (FIG. 4), in which the outer zone 6' forms a hollow cylinder closed at the bottom, i.e. it has the form of a cup. The hollow space is filled with a cylindrical or disc-shaped core zone 5'. The cutting member 2' in this case has three cutting edges 7', 8' and 9', which intersect at a point on the upper edge to form a cutting point.

To produce the blanks, it was found preferable to use a preformed cemented carbide body which forms the outer zone 6 or 6', into the inner space of which for example a mixture of diamond particles and cobalt powder was placed. The inner space can be lined with a thin zirconium or tantalum foil, about 100 microns in thickness. The preformed cemented carbide body 6 or 6', together with its contents forming the core zone were placed in the reaction zone of a high pressure/temperature apparatus and exposed to a temperature of e.g. about 1500° C. and a pressure of e.g. about 60 kilobars to bond the diamond/cobalt mixture into a hard polycrystalline conglomerate. The elevated pressure and temperature treatment was maintained for a period of about 20 minutes. The temperature was allowed to return to the ambient temperature and the pressure was released. In the resulting blanks 4, 4', the core zone 5, 5' formed a strongly bonded unit with the outer zone 6, 6'. The blanks were then cut into sections by means of spark erosion, forming cutting elements.

What is claimed is:

1. A cutting element for the processing of rock in particular, but also metal, comprising a support member of cemented carbide or the like hard material and a cutting member made of polycrystalline diamond or cubic boron nitride cutting material, said members together forming said cutting element, characterized in that the cutting element is formed by a wedge-shaped cutout of a blank comprising a core zone of the cutting material and an outer zone of the said hard support material completely surrounding said core zone in the form of a shell, at least at the periphery thereof.

2. A cutting element according to claim 1, characterized in that at least three boundary lines of the cutting member angularly intersect each other to form cutting edges.

3. A cutting element according to claim 1, characterized in that the support member of the cutting element supports the entire bottom surface as well as the entire rear surface of the cutting member.

4. A cutting element according to claim 1, characterized in that the outer zone of the blank forms an annular body surrounding the core zone at the periphery thereof only.

5. A cutting element according to claim 1, characterized in that the outer zone of the blank forms a hollow cylinder closed at the bottom thereof.

6. a cutting element according to claim 1, characterized in that the outer zone of the blank is formed by a separate preformed body, and the core zone is sinter bonded to the preformed body.

* * * * *